(12) United States Patent
Belcher et al.

(10) Patent No.: US 8,616,274 B2
(45) Date of Patent: Dec. 31, 2013

(54) SYSTEM AND METHOD FOR REMOTE WELLBORE SERVICING OPERATIONS

(75) Inventors: Donald A. Belcher, Duncan, OK (US);
Robert L. Toellner, Duncan, OK (US);
Ronald E. Dant, Duncan, OK (US);
Dean A. Thompson, Duncan, OK (US);
Kenny L. McConnell, Lone Grove, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 908 days.

(21) Appl. No.: 12/775,800

(22) Filed: May 7, 2010

(65) Prior Publication Data
US 2011/0272144 A1    Nov. 10, 2011

(51) Int. Cl.
*E21B 47/00* (2012.01)
(52) U.S. Cl.
USPC .................................. 166/250.01; 340/853.3
(58) Field of Classification Search
USPC .................. 340/853.3, 853.1; 166/250.01
See application file for complete search history.

(56) References Cited

U.S. PATENT DOCUMENTS

| | | |
|---|---|---|
| 4,901,563 A | 2/1990 | Pearson |
| 4,926,544 A | 5/1990 | Koyanagi et al. |
| 4,986,384 A | 1/1991 | Okamoto et al. |
| 5,211,678 A | 5/1993 | Stephenson et al. |
| 5,272,920 A | 12/1993 | Stephenson et al. |
| 5,287,384 A | 2/1994 | Avery et al. |
| 5,309,351 A | 5/1994 | McCain et al. |
| 5,319,964 A | 6/1994 | Stephenson et al. |
| 5,346,012 A | 9/1994 | Heathman et al. |
| 5,400,018 A | 3/1995 | Scholl et al. |
| 5,416,906 A | 5/1995 | Mariani |
| 5,448,479 A | 9/1995 | Kemner et al. |
| 5,488,277 A | 1/1996 | Nishikawa et al. |
| 5,504,482 A | 4/1996 | Schreder |
| 5,553,492 A | 9/1996 | Barrett et al. |
| 5,559,520 A | 9/1996 | Barzegar et al. |
| 5,588,488 A | 12/1996 | Vijn et al. |

(Continued)

FOREIGN PATENT DOCUMENTS

| | | |
|---|---|---|
| EP | 1444671 B1 | 6/2005 |
| EP | 1574998 A1 | 9/2005 |

(Continued)

OTHER PUBLICATIONS

Asaka, S., et al., "Method for processing production progress data with error correction," IDM Technical Disclosure Bulletin, Dec. 1995, pp. 561-563, Delphion.

(Continued)

*Primary Examiner* — Daniel P Stephenson
*Assistant Examiner* — Ronald Runyan
(74) *Attorney, Agent, or Firm* — John Wustenberg; Conley Rose, P.C.

(57) ABSTRACT

A method of servicing a wellbore is provided. The method comprises establishing a communication link between a wellsite and a central control site, wherein the communication link carries sensor, audio, and video data to the central control site and carries command parameters to the wellsite to command wellbore servicing equipment on the wellsite. The data transmitted by the wellsite is analyzed at the central control site, stored in a data store at the central control site, and the results of analysis displayed on a display at the central control site.

20 Claims, 8 Drawing Sheets

(56) References Cited

U.S. PATENT DOCUMENTS

| | | |
|---|---|---|
| 5,612,953 A | 3/1997 | Olnowich |
| 5,646,844 A | 7/1997 | Gudat et al. |
| 5,650,928 A | 7/1997 | Hagenbuch |
| 5,659,779 A | 8/1997 | Laird et al. |
| 5,682,139 A | 10/1997 | Pradeep et al. |
| 5,825,981 A | 10/1998 | Matsuda |
| 5,848,368 A | 12/1998 | Allen et al. |
| 5,850,341 A | 12/1998 | Fournier et al. |
| 5,864,772 A | 1/1999 | Alvarado et al. |
| 5,913,364 A | 6/1999 | Sweatman |
| 5,936,539 A | 8/1999 | Fuchs |
| 5,959,547 A | 9/1999 | Tubel et al. |
| 5,963,508 A | 10/1999 | Withers |
| 5,995,888 A | 11/1999 | Hagenbuch |
| 6,018,659 A | 1/2000 | Ayyagari et al. |
| 6,148,196 A | 11/2000 | Baumann |
| 6,167,967 B1 | 1/2001 | Sweatman |
| 6,246,320 B1 | 6/2001 | Monroe |
| 6,256,594 B1 | 7/2001 | Yamamoto et al. |
| 6,258,757 B1 | 7/2001 | Sweatman et al. |
| 6,266,577 B1 | 7/2001 | Popp et al. |
| 6,351,697 B1 | 2/2002 | Baker |
| 6,356,205 B1 | 3/2002 | Salvo et al. |
| 6,356,822 B1 | 3/2002 | Diaz et al. |
| 6,437,692 B1 | 8/2002 | Petite et al. |
| 6,519,568 B1 | 2/2003 | Harvey et al. |
| 6,611,740 B2 | 8/2003 | Lowrey et al. |
| 6,677,861 B1 | 1/2004 | Henry et al. |
| 6,691,779 B1 * | 2/2004 | Sezginer et al. ......... 166/250.01 |
| 6,718,263 B1 | 4/2004 | Glass et al. |
| 6,728,514 B2 | 4/2004 | Bandeira et al. |
| 6,745,153 B2 | 6/2004 | White et al. |
| 6,751,444 B1 | 6/2004 | Meiyappan |
| 6,751,452 B1 | 6/2004 | Kupczyk et al. |
| 6,778,097 B1 | 8/2004 | Kajita et al. |
| 6,943,697 B2 | 9/2005 | Ciglenec et al. |
| 6,954,689 B2 | 10/2005 | Hanson et al. |
| 6,967,589 B1 | 11/2005 | Peters |
| 6,978,211 B2 | 12/2005 | Soliman et al. |
| 6,985,750 B1 | 1/2006 | Vicknair et al. |
| 7,066,284 B2 | 6/2006 | Wylie et al. |
| 7,366,769 B2 | 4/2008 | Kaan et al. |
| 7,391,675 B2 | 6/2008 | Drew |
| 7,397,363 B2 | 7/2008 | Joao |
| 7,423,550 B2 | 9/2008 | Reckmann et al. |
| 7,457,295 B2 | 11/2008 | Saunders et al. |
| 7,551,546 B2 | 6/2009 | Ma et al. |
| 7,558,603 B2 | 7/2009 | Kadel et al. |
| 7,660,577 B2 | 2/2010 | Radosta et al. |
| 7,832,500 B2 | 11/2010 | Garcia et al. |
| 7,881,869 B2 | 2/2011 | Clayton et al. |
| 8,024,083 B2 | 9/2011 | Chenn |
| 2002/0119781 A1 | 8/2002 | Li et al. |
| 2002/0156558 A1 | 10/2002 | Hanson et al. |
| 2003/0058125 A1 | 3/2003 | Ciglenec et al. |
| 2003/0157975 A1 | 8/2003 | Kadel et al. |
| 2003/0163233 A1 | 8/2003 | Song et al. |
| 2003/0169824 A1 | 9/2003 | Chayat |
| 2004/0001429 A1 | 1/2004 | Ma et al. |
| 2004/0142696 A1 | 7/2004 | Saunders et al. |
| 2004/0205280 A1 | 10/2004 | Jeansonne et al. |
| 2005/0101268 A1 | 5/2005 | Radosta et al. |
| 2005/0169229 A1 | 8/2005 | Cho et al. |
| 2005/0236152 A1 * | 10/2005 | Siebrits et al. ............. 166/250.1 |
| 2006/0007849 A1 | 1/2006 | Kim et al. |
| 2006/0062084 A1 | 3/2006 | Drew |
| 2006/0153005 A1 | 7/2006 | Herwanger et al. |
| 2006/0261933 A1 | 11/2006 | Deniau et al. |
| 2007/0005201 A1 | 1/2007 | Chenn |
| 2007/0061155 A1 | 3/2007 | Ji et al. |
| 2007/0258525 A1 | 11/2007 | Jacobsen et al. |
| 2008/0037746 A1 * | 2/2008 | Dufrene et al. ......... 379/201.01 |
| 2008/0162085 A1 | 7/2008 | Clayton et al. |
| 2008/0231466 A1 | 9/2008 | Mazrooee et al. |
| 2009/0153354 A1 | 6/2009 | Daussin et al. |
| 2011/0120702 A1 | 5/2011 | Craig |

FOREIGN PATENT DOCUMENTS

| | | |
|---|---|---|
| EP | 1637695 A1 | 3/2006 |
| EP | 1653044 A2 | 5/2006 |
| GB | 2317406 A | 3/1998 |
| GB | 2353546 A | 2/2001 |
| WO | 0077621 A2 | 12/2000 |
| WO | 0077621 A3 | 12/2000 |
| WO | 0126331 A2 | 4/2001 |
| WO | 0126331 A3 | 4/2001 |
| WO | 0133868 A2 | 5/2001 |
| WO | 0133868 A3 | 5/2001 |
| WO | 2005089404 A2 | 9/2005 |
| WO | 2005089404 A3 | 9/2005 |
| WO | 2007047359 A2 | 4/2007 |
| WO | 2007047359 A3 | 4/2007 |

OTHER PUBLICATIONS

Bain, L. R., et al., "Database and network technologies: an integral tool for methane development," SPE 22291, 1991, pp. 23-31, Society of Petroleum Engineers.

Benbow, M. S., "A fiber optic broadband telecommunications system for the Gulf of Mexico's largest offshore complex," OTC 6680, 1991, pp. 311-316, Offshore Technology Conference.

Chaudhary, S. A., et al., "Modem transmission of data for 3-D fracture modelling," SPE 26222, 1993, pp. 51-58, Society of Petroleum Engineers.

Crow, Brian P., et al., "IEEE 802.11 Wireless local area networks," IEEE Communications Magazine, Sep. 1997, pp. 116-126, IEEE.

Dassen, Jos, "Advances in field data capturing to optimize asset team reservoir development decision process," SPE 39730, 1998, pp. 1-7, Society of Petroleum Engineers, Inc.

De La Garza, Jesus, et al., "Wireless communication and computing at the construction jobsite," Automation in Construction, 1998, vol. 7, pp. 327-347, Elsevier Science B. V.

Doganata, Y. N., et al., "Data communication system for automatic vehicle identification," IBM Technical Disclosure Bulletin, Apr. 1994, pp. 235-238, Delphion.

Duffy, John D., "A perspective on systems and controls engineering in the earth moving and construction industry," Proceedings of the American Control Conference, Jun. 1998, pp. 813-817, AACC.

Duncombe, Christopher B., "Integration of commercial routing with flood search routing," IEEE Military Communications Conference, 1998, pp. 422-425, IEEE.

Epstein, Marvin, et al., "Application of commercial wireless LAN technology to forward area mobile communication," IEEE Military Communications Conference, Oct. 1993, vol. 1, pp. 490-496, IEEE.

Foreman, R. D., "The drilling command and control system," SPE 14387, 1985, 11 pages, Society of Petroleum Engineers.

Gerla, Mario, et al., "Multicluster, mobile, multimedia radio network," Wireless Networks, 1995, vol. 1, pp. 255-265, J. C. Baltzer AG, Science Publishers.

Haas, Zygmunt J., et al., "On some challenges and design choices in ad-hoc communications," IEEE Military Communications Conference, 1998, pp. 187-192, IEEE.

Isaacs, W. R., et al., "Design and impact of a real-time drilling data center," SPE 13109, 1984, 8 pages, Society of Petroleum Engineers of AIME.

Ito, T., "Emerging technology—a portable SCADA system," Paper 97-48, 13 pages, The Petroleum Society.

Korane, Kenneth J., "Satellites spur precision mining," Machine Design, May 21, 1998, vol. 70, No. 9, pp. 68-72, ABI/INFORM Global.

McChesney, James R., "Optimization of tactical multimedia networks in the forward area," IEEE, 1997, pp. 1156-1162, IEEE.

McGinley, P. J., "Leveraging off advances in internet technology to bring data to the expert user on-shore," SPE 56687, 1999, pp. 1-7, Society of Petroleum Engineers Inc.

(56) References Cited

OTHER PUBLICATIONS

Mohamed, Y., et al., "A novel resource allocation scheme for ad hoc radio local area networks," IEEE 47th Vehicular Technology Conference, May 1997, pp. 1301-1305, IEEE.
Murchie, S., et al., "Innovations in global electronic data delivery," SPE 56686, 1999, pp. 1-11, Society of Petroleum Engineers Inc.
Park, Vincent D., et al., "Applicability of the temporally-ordered routing algorithm for use in mobile tactical networks," IEEE Military Communications Conference, 1998, pp. 426-430, IEEE.
Pomalaza-Raez, Carlos, "Network management of wireless tactical networks," MILCOM 97 Proceedings, vol. 3, pp. 1553-1557, IEEE.
Royer, Elizabeth M., "A review of current routing protocols for ad hoc mobile wireless networks," IEEE Personal Communications, Apr. 1999, pp. 46-55, IEEE.
Schmaltz, S. M., "The automation of a sulphur mine," OTC 6679, 1991, pp. 305-310, Offshore Technology Conference.
Schmitzer, J. L., et al., "Work-flow automation enhances job performance and improves job-execution data," SPE Computer Applications, Dec. 1997, pp. 167-170, Society of Petroleum Engineers.
Scott, Keith, et al., "Formation and maintenance of self-organizing wireless networks," IEEE, 1998, pp. 31-35, IEEE.
Shibata, Tsutayuki, et al., "Cellular local area radio network: CELARN," IEEE, 1994, pp. 629-633, IEEE.
Stephenson, Thomas E., "ATM over satellite for the warfighter," IEEE Military Communications Conference, 1998, pp. 550-553.
Stone, William C., et al., "Automation infrastructure system for a robotic 30-ton bridge crane," Robotics 98 Proceedings of the Conference, Apr. 1998, pp. 195-201.
Stone, W., et al., "NIST research toward construction site integration and automation," Journal of Aerospace Engineering, Apr. 1999, pp. 50-57.
Thomas, R. L., et al., "The impact of fracturing fluids on conductivity and performance in low-temperature wells," SPE 18862, 1989, pp. 347-356, Society of Petroleum Engineers, Inc.
Tomlinson, H. L., et al., "Fracturing process control and automation," SPE 17315, 1986, pp. 371-378, Society of Petroleum Engineers.
Van Domelen, M. L., et al., "Onsite design, analysis, and automation maximizes efficiency of fracturing operations," SPE 18863, 1989, pp. 357-363, Society of Petroleum Engineers, Inc.
Veenkant, R., et al., "Satellite communications change drilling operations and procedures," SPE 14072, 1986, pp. 525-533, Society of Petroleum Engineers.
Walker, Jeffrey, "Construction vehicle navigation and automation," Construction Productivity Advancement Research (CPAR) Program, Aug. 1996, 54 pages, U.S. Army Corps of Engineers.
Wu, C. W., et al., "AMRIS: a multicast protocol for ad hoc wireless networks," IEEE, 1999, pp. 25-29, IEEE.
Close, D. A., et al., "New information systems promise the benefits of the Information Age to the drilling industry," IADC/SPE 39331, 1998, pp. 337-349, IADC/SPE Drilling Conference.
Ganz, Aura, et al., "Robust superpoll protocol for IEEE 802.11 wireless LANs," 1998, IEEE Military Communications Conference, vol. 3, pp. 570-574, IEEE.
Hendrickson, Richard, "Globalstar for the military," 1998, pp. 808-813, IEEE.
Newman, N. P., et al., "Joint adaptive communications system (JACS) concept validation study," RL-TR-97-37, Final Technical Report, Jul. 1997, 61 pages, Rome Laboratory.
Foreign Communication from a related counterpart application—International Preliminary Report on Patentability, PCT/GB2008/004062, Jun. 24, 2010, 8 pages.
Foreign communication from a related counterpart application—International Search Report and Written Opinion, PCT/GB2008/004062, Sep. 8, 2009, 12 pages.
Foreign communication from a related counterpart application, International Search Report and Written Opinion, PCT/GB2011/000632, Aug. 29, 2011, 9 pages.
Future Combat Systems (Brigade Combat Team) (FCS (BCT)), Case # GOVT 07-7028, Mar. 14, 2007, 16 pages.
Honeywell brochure entitled "Smart distributed system," http://content.honeywell.com/sensing/prodinfo/sds/, Apr. 26, 2006, 1 page.
Memarzadeh, M., et al., "Maximizing the fidelity of log signals transmitted via digital telemetry," SPE 102819, XP-002538708, 2008, pp. 1-6, Society of Petroleum Engineers.
Office Action dated Jul. 23, 2010 (20 pages), U.S. Appl. No. 11/688,095, filed Mar. 19, 2007.
Office Action (Final) dated Dec. 23, 2010 (25 pages), U.S. Appl. No. 11/688,095, filed Mar. 19, 2007.
Office Action dated Jul. 6, 2011 (37 pages), U.S. Appl. No. 11/956,839, filed Dec. 14, 2007.
Tyson, Jeff, et al., "How PCI works," howstuffworks®, http://computer.howstuffworks.com/pci.htm/printable, Aug. 7, 2006, 8 pages.
Yin, Hujun, et al., "OFDMA: a broadband wireless access technology," Sarnoff Symposium, Mar. 27-28, 2006, 8 pages, IEEE.
Patent application entitled "Method for Monitoring and Controlling Well Bore Service Equipment on a Mobile LAN Network," by Ronald E. Dant, et al., filed Sep. 20, 2004 as U.S. Appl. No. 10/945,216.
Tyson, Jeff, et al. "How PCI Works," HowStuffWorks, http://computer.howstuffworks.com/pci.htm/printable, Aug. 7, 2006, 8 pages.
USPTO Notice of Allowance, U.S. Appl. No. 11/956,839, Feb. 23, 2012, 5 pages.
USPTO Final Office Action, U.S. Appl. No. 11/956,839, Dec. 6, 2011, 14 pages.
Foreign communication from a related counterpart application—International Preliminary Report on Patentability, PCT/GB2011/000632, Nov. 13, 2012, 7 pages.

\* cited by examiner

SYSTEM AND METHOD FOR REMOTE WELLBORE SERVICING OPERATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons may be produced from wellbores drilled from the surface through a variety of producing and non-producing formations. The wellbore may be drilled substantially vertically or may be an offset well that is not vertical and has some amount of horizontal displacement from the surface entry point. In some cases, a multilateral well may be drilled comprising a plurality of wellbores drilled off of a main wellbore, each of which may be referred to as a lateral wellbore. Portions of lateral wellbores may be substantially horizontal to the surface. In some provinces, wellbores may be very deep, for example extending more than 10,000 feet from the surface.

A variety of servicing operations may be performed on a wellbore after it has been initially drilled. A lateral junction may be set in the wellbore at the intersection of two lateral wellbores and/or at the intersection of a lateral wellbore with the main wellbore. A casing string may be set and cemented in the wellbore. A liner may be hung in the casing string. The casing string may be perforated by firing a perforation gun. A packer may be set and a formation proximate to the wellbore may be hydraulically fractured, acidized, and/or expanding gel injected. A plug may be set in the wellbore. A wellbore may be cleaned out or swept to remove fines, debris, and/or damage that has entered the wellbore. Those skilled in the art may readily identify additional wellbore servicing operations. In many servicing operations, a downhole tool is conveyed into the wellbore to accomplish the needed wellbore servicing operation, for example by some triggering event initiating one or more functions of the downhole tool.

SUMMARY

In an embodiment, a method of servicing a wellbore is disclosed. The method comprises transporting a plurality of first wellbore servicing equipment to a first wellsite and establishing an equipment communication link between at least some of the first wellbore servicing equipment and a first job local area network. The method further comprises converting communications from the first job local area network directed to a remotely located central control site from job local area network packets to internet protocol packets and converting communications from the central control site directed to the first job local area network from internet protocol packets to job local area network packets. The method further comprises establishing radio communication link between an on-site portable radio at the first wellsite and an on-site radio station at the first wellsite, converting a baseband signal based on a radio transmission received by the on-site radio station at the first wellsite from the on-site portable radio at the first wellsite to an internet protocol packet audio stream, and converting a video stream generated by an on-site video camera at the first wellsite to an internet protocol video stream. The method further comprises establishing a communication link between the first wellsite and the central control site, wherein the communication link carries the internet protocol video stream based on the video stream generated by the on-site video camera at the first wellsite to the central control site, carries the internet protocol audio stream based on the radio transmission received by the on-site radio station at the first wellsite to the central control site, carries data generated by the first wellbore servicing equipment to the central control site, carries control parameters from the central control site to the first wellsite, carries internet protocol audio from the central control site to the first wellsite. The method further comprises displaying the video stream from the first wellsite on a display at the central control site, analyzing at the central control site the data generated by the first wellbore servicing equipment, and storing the data generated by the first wellbore servicing equipment in a data store at the central control site. The method further comprises displaying the results of the analysis of the data generated by the first wellbore servicing equipment on a display at the central control site, entering job control parameters for the first wellbore servicing equipment at the central control site, and transmitting the job control parameters for the first wellbore servicing equipment entered at the central control site to the first wellsite, wherein the first wellbore servicing equipment is commanded to service a first wellbore. In an embodiment, the analyzing is performed by a wellbore fracturing analysis software program executing on an at least one computer at the central control site. In an embodiment, the first wellbore servicing equipment comprises at least one of a cement controller, a sand controller, a pump controller, a blender controller, a tote controller, an additive controller, or an instrumentation controller. In an embodiment, the equipment communication links between the first wellbore servicing equipment and the first job local area network is provided in part by a wireless communication link. In an embodiment, the communication link between the first wellsite and the central control site is provided at least in part by a satellite communication link. In an embodiment, the method further comprises testing the communication link between the first wellsite and the central control site. In an embodiment, the testing comprises validating that data generated by the first wellbore servicing equipment is received at the central control site and that control parameters from the central control site are received at the first wellbore servicing equipment. In an embodiment, the method may further comprise transporting a plurality of second wellbore servicing equipment to a second wellsite and establishing an equipment communication link between at least some of the second wellbore servicing equipment and a second job local area network; converting communications from the second job local area network directed to the remotely located central control site from job local area network packets to internet protocol packets; converting communications from the central control site directed to the second job local area network from internet protocol packets to job local area network packets; establishing a radio communication link between a plurality a portable radio at the second wellsite and an on-site radio station at the second wellsite; converting a baseband signal based on a radio transmission received by the on-site radio station at the second wellsite from the on-site portable radio at the second wellsite to an internet protocol packet audio stream; converting a video stream generated by an on-site video camera at the second wellsite to an internet protocol video stream; establishing a communication link between the second wellsite and the central control site, wherein the communication link carries the internet protocol video stream generated by the on-site video camera at the second wellsite to the central control site, carries the internet protocol audio stream based on the radio transmission received by the on-site radio station at the second wellsite to the central control site, carries data generated by the second wellbore servicing equipment to the central control site, carries control parameters from the central control site to the second wellsite, carries internet protocol audio from the central control site to the second wellsite; displaying the video stream from the second wellsite on a display at the central control site; analyzing at the central control site the data generated by the second wellbore servicing equipment; storing the data generated by the second wellbore servicing equipment in a data store at the central control site; displaying the results of the analysis of the data generated by the second wellbore servicing equipment on a display at the central control site; entering job control parameters for the second wellbore servicing equipment at the central control site; and transmitting the job control parameters for the second wellbore servicing equipment entered at the central control site to the second wellsite, wherein the second wellbore servicing equipment is commanded to service a second wellbore. In an embodiment, the job control parameters for the second wellbore servicing equipment are based at least in part on the data generated by the first wellbore servicing equipment and on the data generated by the second wellbore servicing equipment. In an embodiment, the job control parameters for the first wellbore servicing equipment are based at least in part on the data generated by the first wellbore servicing equipment and on the data generated by the second wellbore servicing equipment.

In an embodiment, a method of servicing a wellbore is disclosed. The method comprises initiating a plurality of wellbore servicing equipment at a wellbore site and initiating a central control site. The method further comprises establishing a communication link between the wellbore site and the central control site, the communication link carrying internet protocol video packets, internet protocol audio packets based on radio communication among wellbore site personnel, and sensor data generated by the wellbore servicing equipment from the wellbore site to the central control site and carrying control parameters from the central control site to the wellbore site, whereby the control parameters at least in part command the operation of the wellbore servicing equipment. The method further comprises inputting operational parameters to a first stimulation modeling system executing at the central control site, wherein the first stimulation modeling system receives sensor inputs from the wellbore site, stores the sensor inputs and the operational parameters to a first data store, models fluid behavior, predicts fluid behavior, and presents modeled and predicted fluid behavior. The method further comprises transmitting operational parameters and information about the modeled fluid behavior and predicted fluid behavior to a second stimulation modeling system executing at the wellbore site to establish a stimulation modeling and prediction alliance. The method further comprises performing a wellbore servicing job using the wellbore servicing equipment, wherein the wellbore servicing equipment is controlled at least in part from the central control site based on the control parameters transmitted to the wellbore site from the central control site over the communication link. In an embodiment, the wellbore servicing equipment comprises at least one of a cement controller, a sand controller, a pump controller, a blender controller, a tote controller, an additive controller, or an instrumentation controller. In an embodiment, the method further comprises testing the communication link between the wellbore site and the central control site. In an embodiment, the method further comprises the second stimulation modeling system storing sensor inputs to a second data store, the second stimulation modeling system determining that the communication link between the wellbore site and the central control site has been restored to service after a service interruption, and the second stimulation modeling system reestablishing the stimulation modeling and prediction alliance in response to determining that the communication link has been restored, wherein reestablishing the alliance comprises transmitting data from the second data store to the first data store. In an embodiment, the operational parameters comprise one or more wellbore configuration parameters or one or more wellbore treatment parameters. In an embodiment, the wellbore configuration parameters comprise at least one of a surface line length, a surface line size, a liner length, a liner size, a casing length, a casing size, a tubing length, a tubing size, an open hole length, or an open hole size; and the wellbore treatment parameters comprise one or more of a volume of fluid, an amount of fluid, a type of fluid, a fluid density, a fluid viscosity, a fluid rheological property, a volume of additive, an amount of additive, a type of additive, a volume of proppant, an amount of proppant, a type of proppant, a treatment pressure, or a treatment time interval. In an embodiment, the first stimulation modeling system models fluid behavior in real-time, predicts fluid behavior in real-time, and predicts bottom hole conditions in real-time, and wherein the wellbore servicing equipment is controlled from the central control site based at least in part on the modeled and predicted fluid behavior and on the predicted bottom hole conditions. In an embodiment, the method further comprises initiating a plurality of wellbore servicing equipment at a second wellbore site and establishing a second communication link between the second wellbore site and the central control site, the communication link carrying at least sensor data generated by the wellbore servicing equipment at the second wellbore site to the central control site and control parameters from the central control site to the wellbore servicing equipment at the second wellbore site, whereby the control parameters sent to the second wellbore site at least in part command the operation of the wellbore servicing equipment at the second wellbore site. In an embodiment, the wellbore servicing job is at least one of a hydraulic fracturing job, an acidation job, and an expandable gel injection job.

In an embodiment, a system for servicing a wellbore is disclosed. The system comprises a first gateway for converting communications from a first job local area network directed to a remotely located central control site from job local area network packets to internet protocol packets and for converting communications from the central control site directed to the first job local area network from internet protocol packets to job local area network packets. The system further comprises a second gateway and a radio transceiver to establish radio communication links between an on-site portable radio at the first wellsite and the second gateway, wherein the second gateway converts communications from the on-site portable radio to internet protocol packets for transmitting to the central control site and converts internet protocol packets from the central control site to communications directed to the on-site portable radio. The system further comprises an on-site video camera and a third gateway to convert a video stream generated by the on-site video camera to an internet protocol video stream. The system further comprises a first communication modem for establishing a communication link between the wellsite and the central control site, wherein the communication link carries the internet protocol video stream based on the video stream generated by the on-site video camera to the central control site, carries the internet protocol audio stream based on the radio transmission received by the second gateway to the central control site, carries data generated by the wellbore servicing equipment to the central control site, carries control parameters from the central control site to the wellsite, carries internet protocol audio from the central control site to the wellsite. The system further comprises a first communication modem for establishing a communication link between the wellsite and the central control site, wherein the communication link carries the internet protocol video stream based on the video stream generated by the on-site video camera to the central control site, carries the internet protocol audio stream based on the radio transmission received by the second gateway to the central control site, carries data generated by the wellbore servicing equipment to the central control site, carries control parameters from the central control site to the wellsite, carries internet protocol audio from the central control site to the wellsite. The system further comprises a first monitor at the central control site that displays the video stream from the first wellsite. The system further comprises a computer at the central control site executing a wellbore fracturing analysis program that analyzes the data generated by the first wellbore servicing equipment. The system further comprises a data store at the central control site that stores the data generated by the first wellbore servicing equipment. The system further comprises a second monitor at the central control site that displays the results of the analysis of the data generated by the first wellbore servicing equipment. The system further comprises a workstation at the central control site for entering job control parameters for the first wellbore servicing equipment, the job control parameters to be transmitted over the communication link from the central control site to the wellsite.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The term "zone" or "pay zone" as used herein refers to separate parts of the wellbore designated for treatment or production and may refer to an entire hydrocarbon formation or separate portions of a single formation such as horizontally and/or vertically spaced portions of the same formation. The various characteristics mentioned above, as well as other features and characteristics described in more detail below, will be readily apparent to those skilled in the art with the aid of this disclosure upon reading the following detailed description of the embodiments, and by referring to the accompanying drawings.

Figure 1:
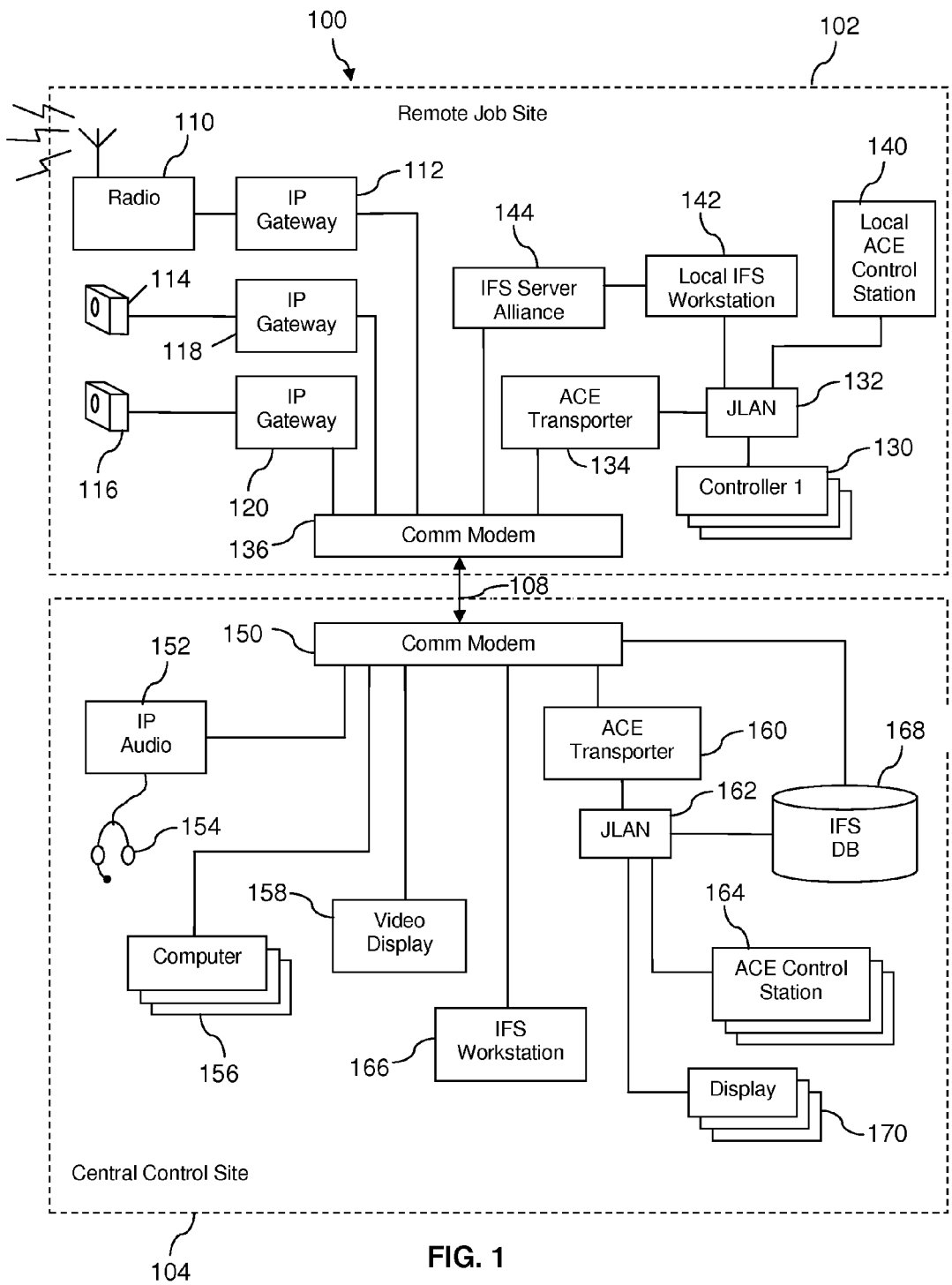
FIG. 1 is an illustration of a remote job site and a central control site according to an embodiment of the disclosure.

Turning now to FIG. 1, a system 100 is described. In an embodiment, the system 100 comprises a first remote job site 102 and a central control site 104 that are in communication with each other via a communication link 108, for example a satellite communication link, a terrestrial wireless communication link, a wired communication link, or other communication link. The remote job site 102 may be a wellbore location and/or a wellsite where a wellbore service job is to be performed, for example a hydraulic fracturing wellbore service job, an acidation wellbore service job, an expendable gel injection wellbore service job, or other wellbore service job. The first remote job site 102 may have a variety of equipment depending on the specific wellbore service job to be performed. Additionally, the equipment may change during the progress of a wellbore service job.

In an embodiment, the first remote job site 102 may comprise a radio 110 in communication with one or more mobile radios, for example "walkie-talkies" or other portable two-way radio communication device that may be carried by operations personnel and/or installed in vehicles. The radio 110 is coupled to a first internet protocol gateway 112. The first remote job site 102 may comprise one or more video cameras, for example a first video camera 114 coupled to a second internet protocol gateway 118 and a second video camera 116 coupled to a third internet protocol gateway 120. While internet protocol gateways 112, 118, and 120 are shown as separate components, it is understood that these gateways may be combined in fewer components (e.g., integrated within a common component or gateway).

The first remote job site 102 may further comprise a plurality of wellbore servicing equipment controllers 130, a local automated control equipment (ACE) control station 140, a local INSITE for Stimulation (IFS) workstation 142, and an IFS server alliance 144 coupled to a first job local area network (JLAN) 132. In an embodiment, the IFS server alliance 144 also may also be coupled to the first communication modem 136. It is understood that the IFS workstation 142 and the IFS server alliance 144 may be replaced in some embodiments by another system providing similar stimulation monitoring, modeling, and predicting functionality. For example, a wellbore fracturing analysis software program may execute on a computer at the first remote job site 102 to provide this functionality. The first JLAN 132 is coupled to a first ACE transporter 134. The internet protocol gateways 112, 118, and 120 and the ACE transporter 134 are coupled to a first communication modem 136. It is understood that while the first JLAN 132 and the first ACE transporter 134 are described above, alternatively another embodiment of a local area network (LAN) may be employed to communicate with the controllers 130 and another mediator and/or gateway application executing on a computer may be used to transcode communications from a format understood by the controllers 130 and/or the local area network to a format understood by the first communication modem 136. Likewise, while an ACE control station 140 is described above, in an embodiment a different workstation or computer executing a controller interface may be employed to enter and to send commands to the controllers 130 via the local area network.

The central control site 104 comprises a second communication modem 150. The communication modems 136, 150 couple the first remote job site 102 and the central control site 104 by the communication link 108. In an embodiment, the central control site 104 further comprises a fourth internet protocol gateway 152 coupled to at least one headset 154 and/or other two-way audio communication terminal. An employee or other operator using the headset 154 may engage in two-way communication with the mobile radios at the first remote job site 102.

The central control site 104 may comprise a plurality of computers 156, at least one video display 158 and/or monitor, and a second ACE transporter 160. The fourth internet protocol gateway 152, the computers 156, the video display 158, and the second ACE transporter 160 are coupled to the second communication modem 150. The second ACE transporter 160 is coupled to a second JLAN 162. The second JLAN 162 is coupled to one or more ACE control stations 164, to an IFS data store 168, to an IFS workstation 166, and to at least one display 170. In an embodiment, the IFS data store 168 may also be coupled to the second communications modem 150.

It is understood that the IFS workstation 166 and the IFS data store 168 may be replaced in some embodiments by another system providing similar stimulation monitoring, modeling, and predicting functionality. It is understood that while the second JLAN 162 and the second ACE transporter 160 are described above, alternatively another embodiment of a local area network (LAN) may be employed to emulate the local area network at the remote job site 102 and another mediator and/or gateway application executing on a computer may be used to transcode communications from a format understood by the local area network to a format understood by the second communication modem 150. Likewise, while an ACE control station 164 is described above, in an embodiment a different workstation or computer executing a controller interface may be employed to enter and to send commands to the controllers 130 via the local area network.

As will be discussed in further detail below, the central control site 104 promotes personnel at a fixed location visually monitoring wellbore servicing activities at the remote job site 102 via video feed streams provided by the video cameras 114, 116; conducting two-way voice communications with personnel located at the remote job site 102 via the radio 110; monitoring, analyzing, and visualizing the status of the controllers 130 based on data streamed back from the first JLAN 132 and the first ACE transporter 134; and controlling the wellbore equipment controllers 130 by sending control parameters from the ACE control station 164 back to the wellbore equipment controllers 130. According to one abstraction of the system 100, the central control site 104 may be conceptualized as a mirror of the remote job site 102.

The system 100 may save the time of highly skilled personnel who may otherwise need to commute to and from the remote job site 102, losing the time of their commute that might otherwise be spent in more productive, valuable activity. Likewise, high level customer representatives may be spared the time of commuting to and from the remote job site 102. Additionally, these same persons may benefit from a more relaxed, comfortable, safer environment at the central control site versus the lesser accommodations of the remote job site 102. Furthermore, as will be discussed hereinafter, the central control site 104 promotes concurrently monitoring and controlling a plurality of remote sites 102 and supports enhanced coordination of selecting control parameters for each of the plurality of remote sites 102 based on the data from each of the remote sites 102.

The radio 110 may be a two-way radio suitable for wireless communication with walkie-talkies or other wireless personal communication devices. In an embodiment, the radio 110 may be a small cellular base transceiver station and/or a femtocell that promotes cellular communication with mobile phones on the remote job site 102, for example mobile phones have push-to-talk capabilities. The radio 110 may communicate with the first internet protocol gateway 112 via baseband or other signals. The radio 110 may send baseband signals originated by wireless communication devices on the remote job site 102 to the first internet protocol gateway 112, and the first internet protocol gateway 112 may convert these baseband signals into an internet protocol packetized format for transmission to the central control site 104, for example as a voice over internet protocol (VoIP) signal or other packetized signal encapsulating the baseband signal. The internet protocol packets provided by the first internet protocol gateway 112 may then be transmitted to the first communication modem 136 and transmitted via the communication link 108 to the second communication modem 150. The second communication modem 150 may distribute these internet protocol packets bearing the audio content from the radio 110 to the fourth internet protocol gateway 152, and the fourth internet protocol gateway 152 may convert these internet protocol packets to an audio signal that may be played back by the headset 154 or other user interface (e.g., speakers associates with one or more workstations or computers located at central control site 104).

The headset 154 may comprise a microphone that captures audio, for example a voice message from an individual at the central control site 104, and the headset 154 sends this audio to the fourth internet protocol gateway 152. The fourth internet protocol gateway 152 converts this audio signal to an internet protocol packetized format for transmission to the remote job site 102, for example as a VoIP signal or other packetized signal encapsulating the audio. The internet protocol packets provided by the fourth internet protocol gateway 152 may then be transmitted to the second communication modem 150 and transmitted via the communication link 108 to the first communication modem 136. The first communication modem 136 may distribute these internet protocol packets bearing the audio content from the headset 154 to the first internet protocol gateway 112. The first internet protocol gateway 112 may convert these internet protocol packets to an audio signal and send this audio signal to the radio 110. The radio 110 may up-convert the audio signal and transmit the audio signal as a radio frequency signal to the mobile radios on the remote job site 102. Alternatively, there may be an interface provided by the headset 154 and/or the fourth internet protocol gateway 152 to select a specific one of the mobile radios on the remote job site 102 to receive the audio signal generated by the headset 154.

The video cameras 114, 116 may be placed where they provide views of different positions on the remote job site 102. One or more of the video cameras 114, 116 may be located to provide video of the wellhead and/or service manifold coupled to the wellhead. Any number of video cameras 114, 116 may be located to provide video of the operation of one or more of the wellbore servicing equipment, for example pumps, blenders, sand dispensers, and other equipment. One or more of the video cameras 114, 116 may be located to provide video of the equipment located under a rig floor, for example a view of blow-out prevention equipment. The focus and direction of the video cameras 114, 116 may be remotely controlled from the central control site 104. In an embodiment, where the number of video cameras 114, 116 at the remote job site 102 may exceed the number of video internet gateways (for example the second internet protocol gateway 118 and the third internet protocol gateway 120), the coupling between a specific video camera 114, 116 to a specific internet protocol gateway 118, 120 may be selected from the central control site 104 to provide the desired image for viewing remotely. While two video cameras 114, 116 and two internet protocol gateways 118, 120 coupled to the video cameras 114, 116 are illustrated in FIG. 1, it is understood in different embodiments different numbers of video cameras and internet protocol gateways coupled to the video cameras may be employed. Also, the video cameras may provide video images in any suitable format such as full motion, stop action, single frame, time-lapsed, or any combination thereof.

Figure 6:
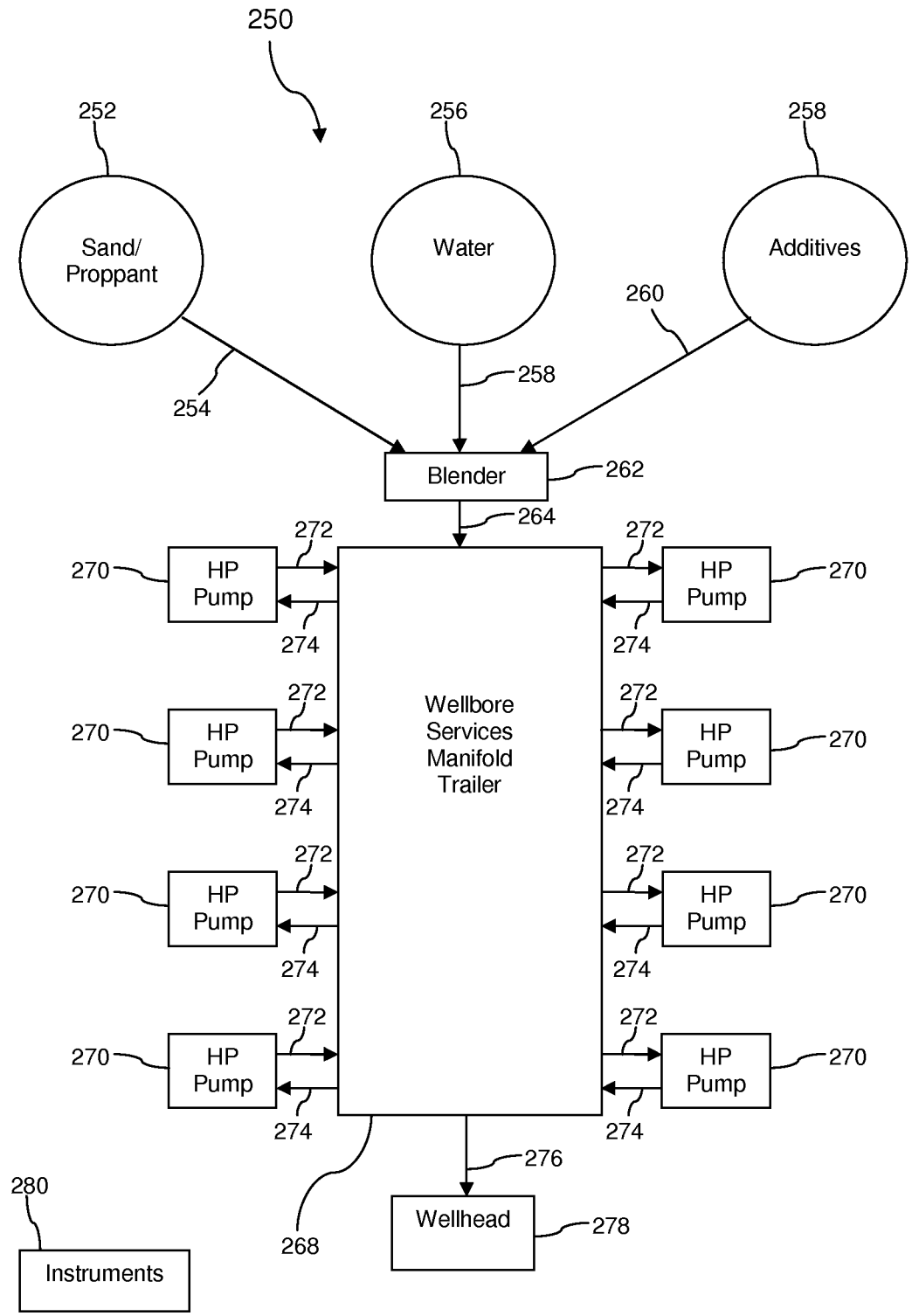
FIG. 6 is an illustration of a wellbore servicing equipment set-up according to an embodiment of the disclosure.

The controllers 130 may be coupled to and each control one or more wellbore servicing equipments, for example a equipment for carrying out a hydraulic fracturing operation as described in more detail herein with reference to FIG. 6. The controllers 130 may take one or more command inputs, for example from the ACE control station 164 at the central control site 104 or from the local ACE control station 140 at the remote job site 102, and control a wellbore servicing equipment based on the command input. For example, a pump controller may receive a flow rate command input, a pressure command input, a sensed output flow rate feedback signal, and a sensed output pressure feedback signal and control a high pressure pump to maintain the output of the pump at the commanded flow rate and at the commanded pressure, for example by controlling a power level supplied by a motor driving the high pressure pump and/or by controlling an amount of displacement (e.g., stroke length) of a variable displacement pump.

The pump controller may recalculate its control outputs to the high pressure pump at a relatively high rate of iteration, for example at about 10 Hz, at about 50 Hz, at about 100 Hz, or at some other rate of iteration effective to provide a stabilized control function for the high pressure pump. It is understood that the commanded inputs need not be updated by the ACE control station 164, 140 at the controller iteration rate. In fact, if the commanded inputs are correctly identified at the outset to provide the desired results of the wellbore servicing operation, these commanded inputs may not need to be changed once set or only changed as the wellbore servicing operation progresses to a different operational phase. On the other hand, if analysis of data gathered/transmitted from the first JLAN 132 to the central control site 104 by the INSITE for Stimulation workstation 166 indicates that the wellbore servicing operation is not achieving the as designed job parameters, the commanded values (e.g., flow rate, pressure) may be adjusted from the ACE control station 164.

The equipment controlled by the controllers 130 may comprise high pressure pumps, cement and/or sand dispensers, blenders, valves, conveyors, additive meters, and other equipment. The controllers 130 may comprise one or more of a cement controller, a sand controller, a pump controller, a blender controller, a tote controller, an additive controller, an instrument controller, and other controller. In an embodiment, a controller may interface to a plurality of sensors and/or instruments and capture data for transmitting via the first JLAN 132 and from the first JLAN 132 to the central control site 104. This controller may capture the subject data at a periodic rate and multiplex this data for transmitting to/from the first JLAN 132.

The first JLAN 132 provides communication links between the controllers 130 and the first ACE transporter 134. The first JLAN 132 may comprise wired links and/or wireless links. For some further details of a local area network for communicating with equipment controllers, see U.S. patent application Ser. No. 10/945,216 filed Sep. 20, 2004, entitled "Method for Monitoring and Controlling Well Bore Service Equipment on a Mobile LAN Network," by Ronald E. Dant et al., incorporated by reference herein in its entirety. In an embodiment, communications on the first JLAN 132 as well as on the second JLAN 162 may employ a proprietary protocol. As mentioned above, in an alternative embodiment, a different local area network may be used in place of the first JLAN 132.

The local IFS workstation 142 and the IFS server alliance 144 collectively may provide for storing data collected from the wellbore service equipment, for analyzing the data locally, and for presenting the results of the analysis for use by personnel on the remote job site 102. This capability may be needed in the event that the communication link between the first communication modem 136 and the second communication modem 150 is temporarily out of service, for example during a satellite communication rain-fade event. The IFS server alliance 144 may have an application that promotes synchronizing the IFS data store 168 at the central control site 104 after the communication link between the first communication modem 136 and the second communication modem 150 is restored to service. Alternatively, the IFS server alliance 144 may provide for writing the subject data to a transportable data storage device and transporting to the central control site 104 after completion of the wellbore servicing job for combining with or supplementing a partial data set that may be stored in the IFS data store 168 for possible post-job analysis and report generation. In another embodiment, the functionality of the local IFS workstation 142 and the IFS server alliance 144 may be provided by other devices, for example a workstation or other computer executing a wellbore fracturing analysis program or executing a stimulation modeling program that receives and stores sensor inputs and control parameters, analyses the sensor inputs and control parameters, models fluid behavior, predicts fluid behavior, and presents the modeled and predicted fluid behavior, for example as graph plots or tabulated data presented on a monitor or computer screen.

The first ACE transporter 134 transforms communications from the format that is natively employed by the first JLAN 132 to internet protocol packets and/or datagrams for transmitting to the second ACE transporter 160 in the central control site 104. The first ACE transporter 134 transforms internet protocol packets and/or datagrams received from the second ACE transporter 160 in the central control site 104 to the format that is employed by the first JLAN 132. The internet protocol packets sent by the first ACE transporter 134 to the second ACE transporter 160 may comprise data from the sensors coupled to the wellbore service equipment and other sensors at the remote job site 102, for example ambient temperature sensors, wind velocity sensors, solar irradiance sensors, precipitation sensors, and others. The internet protocol packets received by the first ACE transporter 134 from the second ACE transporter 160 may include input commands to the controllers 130 and data from the IFS data store 168 in the central control site 104 directed to the IFS server alliance 144.

The first communication modem 136 receives internet protocol streams from the internet protocol gateways 112, 118, 120 and the ACE transporter 134 that are to be transmitted to the second communication modem 150 at the central control site 104. In an embodiment, the first communication modem 136 may perform digital compression on one or more of these internet protocol streams before transmitting the streams over the communication link to the second communication modem 150. Alternatively, one or more of the internet protocol gateways 112, 118, 120 and the first ACE transporter 134 may perform digital compression before sending to the first communication modem 136. The first communication modem 136 may send the several internet protocol streams using separate channels over the communication link 108 to the second communication modem 150. Alternatively, the first communication modem 136 may bundle together and/or multiplex the several internet protocol streams into a single channel for transmitting over the communication link 108 to the second communication modem 150.

The first communication modem 136 also receives internet protocol packets from the second communication modem 150 and distributes these to the appropriate receivers at the remote job site 102, for example the internet protocol gateways 112, 118, 120 and/or the first ACE transporter 134. In an embodiment, the first communication modem 136 may perform decompression processing on some of the internet protocol packages received from the second communication modem 150. Alternatively, the internet protocol gateways 112, 118, 120 and/or the first ACE transporter 134 may perform some decompression processing on some of the internet protocol packages received from the second communication modem 150. The second communication modem 150 performs similar functionality receiving/decompressing internet protocol streams from the first communication modem 136 over the communication link 108 and packaging/compressing/transmitting internet protocol streams to the first communication modem 136 over the communication link 108 as is described above from the perspective of the first communication modem 136.

The communication link 108 between the communication modems 136, 150 may be provided by any known communication technology. In an embodiment, the communication link is provided by a third party communication service provider. In an embodiment, the third party communication service provider may provide both the first communication modem 136 and the second communication modem 150. In a preferred embodiment the communication link may be provided using satellite communications. An advantage of satellite communication is that, generally, satellite communication is widely available throughout the contiguous United States, even in remote and/or mountainous areas. Disadvantages of satellite communication may include cost of service and susceptibility to rain-fade or other weather related events. When alternative communication services are accessible from the remote job site 102, for example terrestrial mobile communication systems such as a cellular phone communication system, the communication link may be provided based on these alternative communication services. For example, one or more channels of wireless communication may be used to establish the communication link using one of code division multiple access (CDMA), evolution data only (EV-DO), global system for mobile communication (GSM), high speed packet data (HSPD), long-term evolution (LTE), worldwide interoperability for microwave access (WiMAX), and other standard wireless communication protocols.

The system 100 may be used to service a wellbore. A plurality of wellbore servicing equipment may be transported to a wellsite. The wellbore servicing equipment may include the apparatus described above with reference to the remote job site 102. The wellbore servicing equipment may further comprise other equipment. At the wellsite, communication links between some of the wellbore servicing equipment and the first JLAN 132 may be established. This may entail laying out cables and plugging cables into connectors and/or establishing wireless communication links. Communications from the first JLAN 132 directed to the central control site 104 may be converted from JLAN packets to internet protocol packets, for example by the first ACE transporter 134. Communications from the central control site 104 directed to the first JLAN 132 may be converted from internet protocol packets to JLAN packets, for example by the first ACE transporter 134.

Radio communication links between portable radios on the remote job site 102 and the radio station 110 may be established. A baseband signal generated by the radio station 110 may be converted to an internet protocol packet audio stream, for example by the first internet protocol gateway 112. One or more video streams may be generated by the video cameras 114, 116, and these video streams may be converted to internet protocol packet video streams, for example by the second and third internet protocol gateways 118, 120.

The communication link is established between the remote job site 102 and the central control site 104, for example a satellite communication link or other communication link. This link may be provided by a communication service provider and may be provided for a transient period of time, for example for a day, for two days, or for a week. The communication link may carry internet protocol packets from the remote job site 102 to the central control site 104 and from the central control site 104 to the remote job site 102, as discussed in more detail above. The communications traffic carried over the communication link may comprise internet protocol video streams, internet protocol audio streams, internet protocol streams carrying data from sensors on the remote job site 102, and control parameters from the central control site 104 to the remote job site 102.

The internet protocol video streams may be displayed on one or more displays at the central control site 104. The data streams from the sensors and from the wellbore servicing equipment at the remote job site 102 may be analyzed by an INSITE for Stimulation (IFS) application executing on the IFS workstation 166 and/or executing on another computer in the central control site 104. The data transmitted from the remote job site 102 to the central control site 104, for example the sensor data, may be stored in an INSITE for Stimulation (IFS) data store, for example the IFS data store 168. The results of the analysis may be displayed on the displays 170 or other displays at the central control site 104. In another embodiment, the functionality of the IFS workstation 166 may be provided by other devices, for example a workstation or other computer executing a wellbore fracturing analysis program or executing a stimulation modeling program that receives and stores sensor inputs and control parameters, analyses the sensor inputs and control parameters, models fluid behavior, predicts fluid behavior, and presents the modeled and predicted fluid behavior, for example as graph plots or tabulated data presented on a monitor or computer screen.

Job control parameters for the wellbore service job being conducted at the remote job site 102 may be entered at the central control site 104 and communicated via the communication link to the remote job site 102, for example to the first JLAN 132. The job control parameters or command inputs may be distributed by the first JLAN 132 to the appropriate controllers 130 to control the wellbore service equipment. This procedure can be extended to address establishing communications with one or more additional remote job sites and monitoring and controlling additional remote job sites concurrently, for example to adjust job control parameters collaboratively. The remote job site 102, the central control site 104, and the communication link 108 between the sites 102, 104 may be tested before launching the wellbore service job, so that any communication faults and/or controller loop faults may be corrected before they may interfere with conducting the wellbore service job.

While the description of the system 100 above was based at least in part on the inclusion of the INSITE system, for example local IFS workstation 142, the IFS server alliance 144, the IFS workstation 166, and the IFS data store 168, in another embodiment the INSITE system may be replaced by another system providing similar stimulation monitoring, modeling, and predicting functionality, for example a different wellbore fracturing analysis program executing on a computer. For example, another system may receive inputs defining operational parameters, model fluid behavior, predict fluid behavior, and predict bottom hole conditions. The alternative system may comprise a first stimulation modeling system executing at the central control site and a second stimulation modeling system executing at the wellbore site that may establish a stimulation modeling and prediction alliance promoted and/or enabled by the communication link 108 between the central control site 104 and the first remote job site 102. If the second stimulation modeling system detects that the communication link 108 has returned to service after being out of service, the second stimulation modeling system may reestablish the stimulation modeling and prediction alliance in response to determining that the communication link has been restored, which may be referred to as resynchronizing the first stimulation modeling system with the second stimulation modeling system. Resynchronizing may comprise transmitting data stored by the second stimulation modeling system, for example in a local data store. This data may comprise sensor information and other information collected at the remote job site 100.

Figure 2:
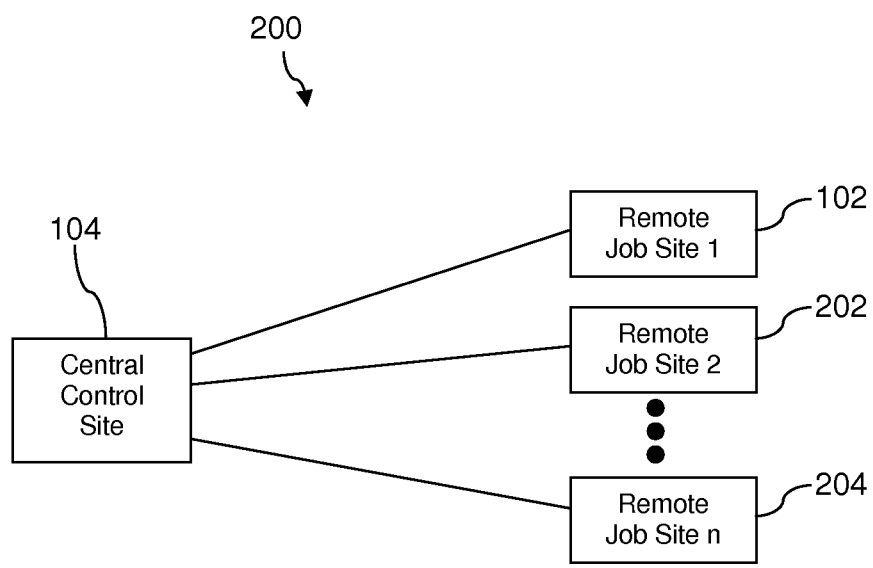
FIG. 2 is an illustration of a plurality of remote jobs sites and a central control site according to an embodiment of the disclosure.

Turning now to FIG. 2, a system 200 is described. The system 200 is an extension of the system 100 described above with reference to FIG. 1. The system 200 comprises the first remote job site 102, the central control site 104, a second remote job site 202, and a third remote job site 204. It is understood that the system 200 may comprise two remote job sites or greater than three remote job sites. The second remote job site 202 and the third remote job site 204 are substantially similar to the first remote job site 102. The central control site 104 in system 200 is used to monitor, analyze data, to visualize the data, and control the wellbore service equipment controllers 130 at each of the remote job sites 102, 202, 204 sequentially and/or concurrently, in whole or in part. The system 200 promotes skilled personnel at the central control site 104 inputting job parameters and controller command inputs for each of the remote job sites 102, 202, 204 in a coordinated manner, for example in a manner that takes notice of the interactions among the progress of concurrently or sequentially executing wellbore service jobs. It is well known to those skilled in the art that a wellbore service job at a first wellbore location may impact a wellbore service job at a second proximate wellbore location, but it may be difficult to make the needed timely and coordinated adjustments to controller command inputs and job parameters at each of the remote job sites 102, 202, 204. The central control site 104 and the communications architecture of the remote job sites 102, 202, 204 taught by the present disclosure promote this kind of timely and coordinated adjustments among concurrent and/or sequential wellbore service jobs, in particular those located in close physical proximity (e.g., the same geological formation and/or wells in communication with one another) and/or those temporally related.

Figure 3A:
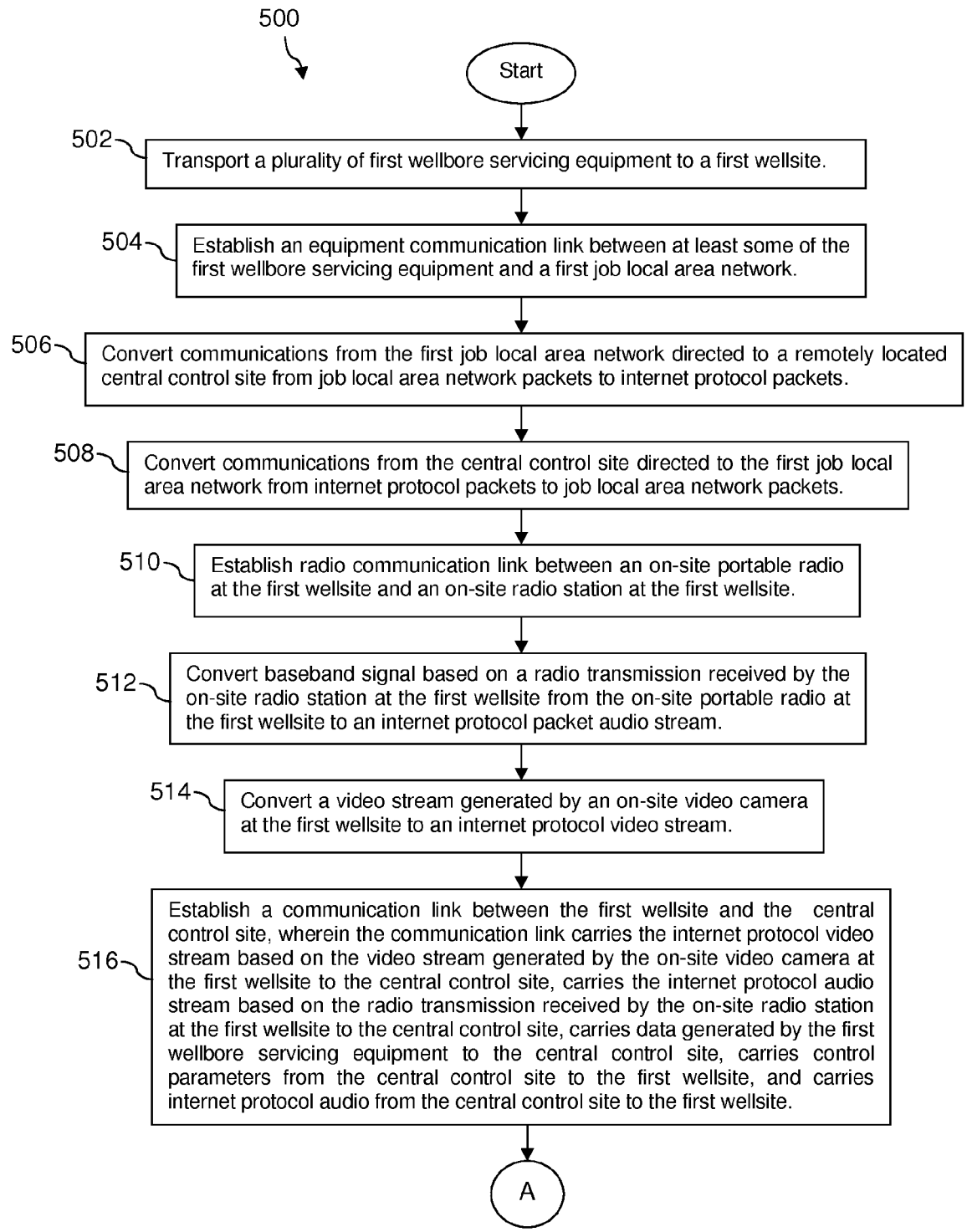
FIG. 3A is a flow chart of a method of servicing a wellbore according to an embodiment of the disclosure.
Figure 3B:
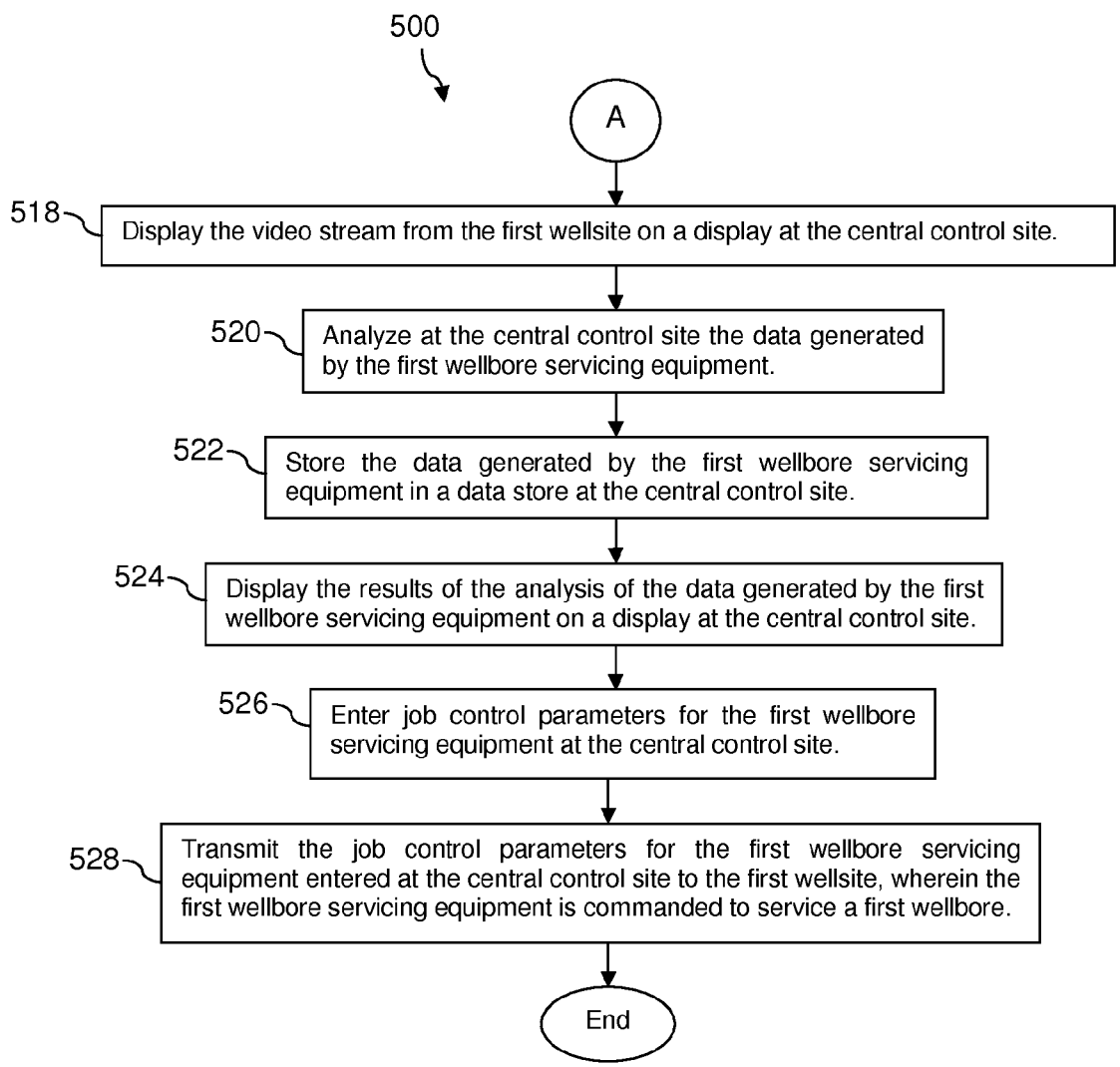
FIG. 3B is a flow chart of a method of servicing a wellbore according to an embodiment of the disclosure.

Turning now to FIG. 3A and FIG. 3B, a method 500 is described. At block 502, a plurality of first wellbore servicing equipment is transported to a first wellsite. In an embodiment, the method may be directed to one or more of performing a hydraulic fracturing job, an acidation job, an expandable gel injection job, a perforation job, and/or other wellbore service job. The wellbore servicing equipment may comprise one or more of a cement controller, a sand controller, a pump controller, a blender controller, a tote controller, an additive controller, an instrumentation controller, and other controllers. At block 504, an equipment communication link between at least some of the first wellbore servicing equipment and a first job local area network is established. In an embodiment, the communication link between the first job local area network and one or more of the first wellbore servicing equipment may be provided by one or more wireless links. In an embodiment, the communication link between the first job local area network and one or more of the first wellbore servicing equipment may be provided by one or more wired links. In an embodiment, the communication links between the first job local area network and the first wellbore servicing equipment may be established with both wireless links to some wellbore servicing equipment and wired links to other wellbore servicing equipment.

At block 506, communications from the first job local area network directed to a remotely located central command site is converted from job local area network packets to internet protocol packets. In this context, remotely located means located at a distance from the first wellsite, for example at greater than a one mile distance, at greater than a ten mile distance, at greater than a twenty-five mile distance, or at some other distance. At block 508, communications from the central control site directed to the first job local area network are converted from internet protocol packets to job local area network packets. At block 510, a radio communication link between an on-site portable radio at the first wellsite is established with an on-site radio station at the first wellsite. At block 512, a baseband signal based on a radio transmission received by the on-site radio station at the first wellsite from the on-site portable radio at the first wellsite is converted to an internet protocol packet audio stream.

At block 514, a video stream generated by an on-site video camera at the first wellsite is converted to an internet protocol video stream. At block 516, a communication link between the first wellsite and the central control site is established. The communication link carries the internet protocol video stream based on the video stream generated by the on-site video camera at the first wellsite to the central control site, carries the internet protocol audio stream based on the radio transmission received by the on-site radio station at the first wellsite to the central control site, carries data generated by the first wellbore servicing equipment to the central control site, carries control parameters from the central control site to the first wellsite, and carries internet protocol audio from the central control site to the first wellsite. The communication link may be provided at least in part by a satellite communication link. Alternatively, the communication link may be provided by a terrestrial wireless communication link and/or a wired communication link.

At block 518, the video stream from the first wellsite is displayed on a display and/or monitor at the central control site. At block 520, the data generated by the first wellbore servicing equipment is analyzed at the first central control site, for example by a wellbore fracturing analysis software system executing on at least one computer at the central control site. Alternatively, the data generated by the first wellbore servicing equipment may be analyzed by a stimulation modeling system that models downhole fluid behavior, predicts downhole fluid behavior, and presents modeled and predicted downhole fluid behavior. In an embodiment, the wellbore fracturing analysis software system and/or the stimulation modeling system may further analyze the data generated by the first wellbore servicing equipment in combination with job control inputs.

At block 522, the data generated by the first wellbore servicing equipment is stored in a data store at the central control site. At block 524, the results of the analysis of the data generated by the first wellbore service equipment is displayed on a display at the central control site. At block 526, enter job control parameters for the first wellbore servicing equipment is entered at the central control site. At block 528, the job control parameters for the first wellbore servicing equipment entered at the central control site are transmitted to the first wellsite, wherein the first wellbore servicing equipment is commanded to service a first wellbore.

In an embodiment, the processing of blocks 502 through 528 may also be performed with reference to a second wellsite, for example a second wellsite which is receiving a wellbore servicing job at the same time. In some cases, the job control parameters sent to the first wellbore servicing equipment may be based in part on the sensor information and the job control parameters associated with the second wellbore servicing equipment, and the job control parameters sent to the second wellbore servicing equipment may be based in part on the sensor information and job control parameters associated with the first wellbore servicing equipment. Likewise, any number of wellbore servicing jobs at any number of wellsites may be controlled at the same time from the central control site. In an embodiment, the devices described above in reference to FIG. 3A and FIG. 3B correspond to the devices and equipment described with reference to FIG. 1.

Figure 4:
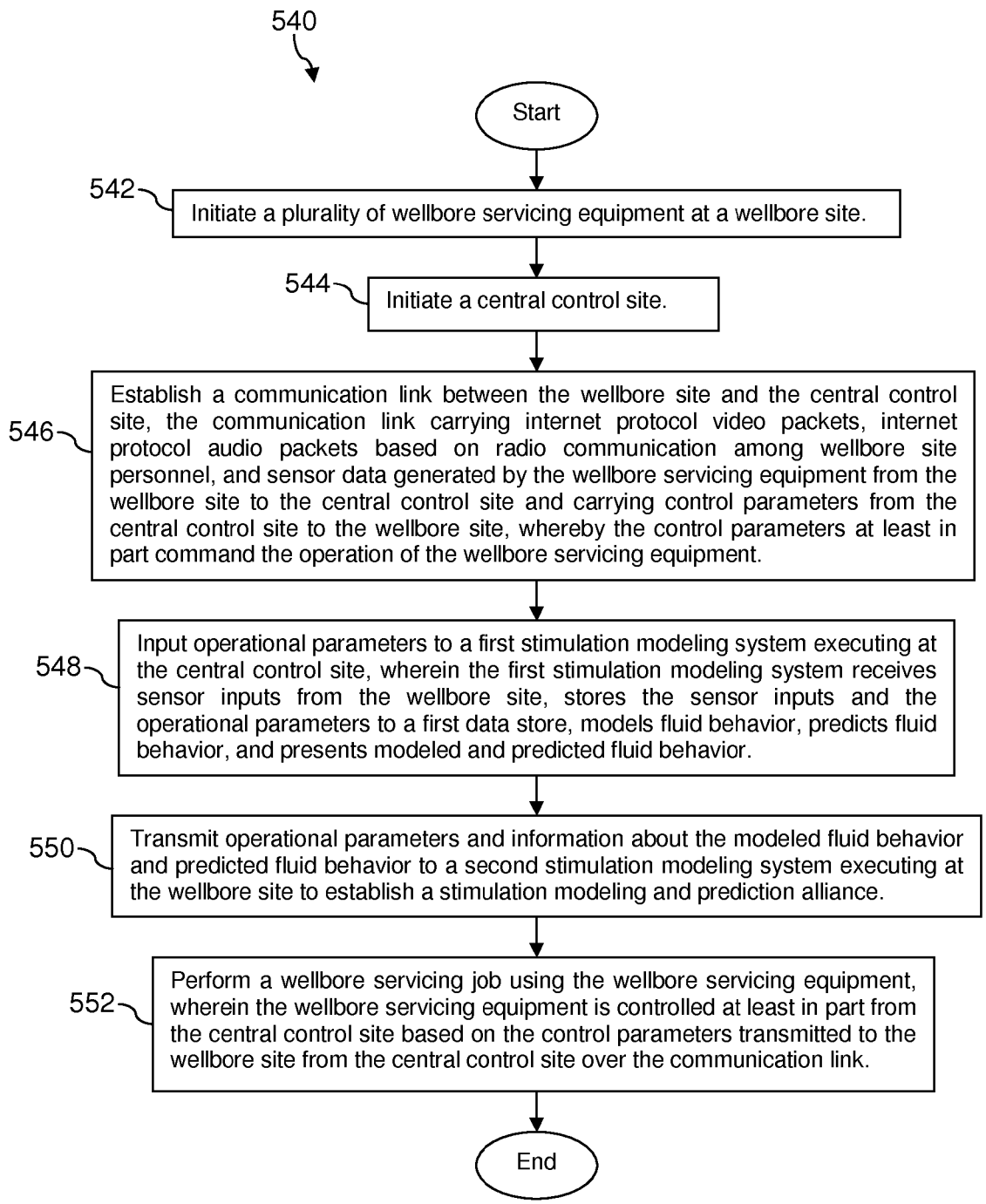
FIG. 4 is a flow chart of a method of servicing a wellbore according to an embodiment of the disclosure.

Turning now to FIG. 4, a method 540 is described. In an embodiment, the method is directed to servicing a wellbore. In an embodiment, the method may be directed to one or more of performing a hydraulic fracturing job, an acidation job, an expandable gel injection job, a perforation job, and/or other wellbore service job. At block 542, a plurality of wellbore servicing equipment at a wellsite are initiated. The wellbore servicing equipment may comprise one or more of a cement controller, a sand controller, a pump controller, a blender controller, a tote controller, an additive controller, or an instrumentation controller. This may involve laying out wire runs to provide communication links between devices, initializing electronics devices, logging onto control workstations, establishing wireless communication networks, and other set-up activities.

At block 544, a central control site is initiated. This may involve initializing computers and communications equipment, logging into computer terminals and/or workstations, and other set-up activities. At block 546, a communication link between the wellbore site and the central control site is established. In an embodiment, the communication link may carry one or more of internet protocol video packets, internet protocol audio packets based on radio communication among wellbore site personnel, and sensor data generated by the wellbore servicing equipment from the wellbore site to the central control site. The communication link may also carry control parameters from the central control site to the wellbore site, whereby the control parameters at least in part command the operation of the wellbore servicing equipment. The method 540 may comprise testing the communication link between the wellbore site and the central control site. In an embodiment, the testing may comprise validating that data generated by the first wellbore servicing equipment is received at the central control site and that control parameters from the central control site are received at the first wellbore servicing equipment.

At block 548, operational parameters are input to a first stimulation modeling system executing at the central control site. In an embodiment, the first stimulation modeling system may receive sensor inputs from the wellbore site, store the sensor inputs and the operational parameters to a first data store, model fluid behavior, predict fluid behavior, and present modeled and predicted fluid behavior. In an embodiment, the first stimulation system may be a wellbore fracturing analysis software program executing on at least one computer in the central control site. The operational parameters may comprise one or more wellbore configuration parameters or one or more wellbore treatment parameters. The wellbore configuration parameters may comprise least one of a surface line length, a surface line size, a liner length, a liner size, a casing length, a casing size, a tubing length, a tubing size, an open hole length, or an open hole size. The wellbore treatment parameters may comprise one or more of a volume of fluid, an amount of fluid, a type of fluid, a fluid density, a fluid viscosity, a fluid rheological property, a volume of additive, an amount of additive, a type of additive, a volume of proppant, an amount of proppant, a type of proppant, a treatment pressure, or a treatment time interval.

At block 550, operational parameters and information about the modeled fluid behavior and predicted fluid behavior are transmitted to a second stimulation modeling system executing at the wellbore site to establish a stimulation modeling and prediction alliance.

At block 552, a wellbore servicing job is performed using the wellbore servicing equipment, wherein the wellbore servicing equipment is controlled at least in part from the central control site based on the control parameters transmitted to the wellbore site from the central control site over the communication link. In an embodiment, the first stimulation modeling system may model fluid behavior in real-time, predict fluid behavior in real-time, and predict bottom hole conditions in real-time. For purposes of the present disclosure, real-time means that the first stimulation modeling system may update displays depicting graphs of sensor data and control parameter values within about 2 seconds, within about 10 seconds, or within about 30 seconds of the collection of the subject sensor data and/or the transmitting of the control parameters. The real-time response, in the present usage, is relative to the sense of timely response experienced by human operators.

Figure 5:
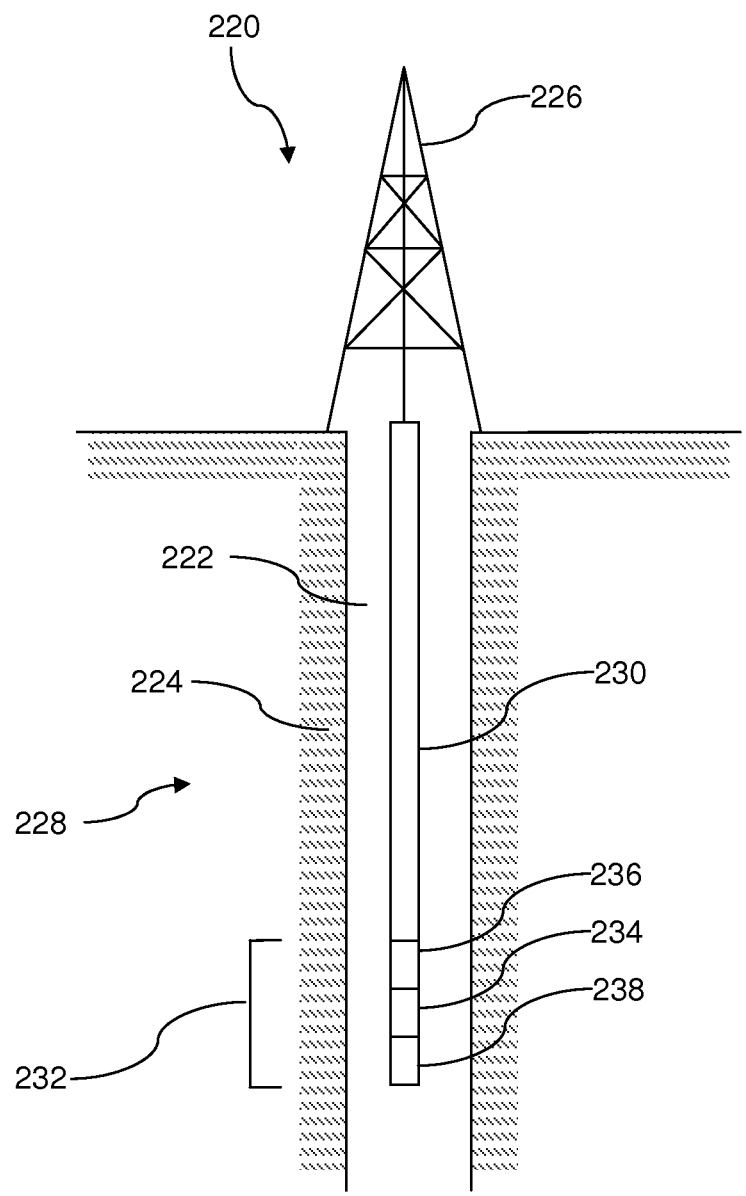
FIG. 5 is an illustration of a wellbore, a conveyance, and a toolstring according to an embodiment of the disclosure.

Turning now to FIG. 5, a wellbore servicing system 220 is described, which may be used in combination with the system 100 described herein to perform a wellbore servicing operation. The system 220 comprises servicing rig 226 that extends over and around a wellbore 222 that penetrates a subterranean formation 224 for the purpose of recovering hydrocarbons, storing hydrocarbons, disposing of carbon dioxide, or the like. The wellbore 222 may be drilled into the subterranean formation 224 using any suitable drilling technique. While shown as extending vertically from the surface in FIG. 3, in some embodiments the wellbore 222 may be deviated, horizontal, and/or curved over at least some portions of the wellbore 222. The wellbore 222 may be cased, open hole, contain tubing, and may generally comprise a hole in the ground having a variety of shapes and/or geometries as is known to those of skill in the art.

The servicing rig 226 may be one of a drilling rig, a completion rig, a workover rig, or other mast structure and supports a workstring 228 in the wellbore 222, but in other embodiments a different structure may support the workstring 228, for example an injector head of a coiled tubing rigup. In an embodiment, the servicing rig 226 may comprise a derrick with a rig floor through which the workstring 228 extends downward from the servicing rig 226 into the wellbore 222. In some embodiments, such as in an off-shore location, the servicing rig 226 may be supported by piers extending downwards to a seabed. Alternatively, in some embodiments, the servicing rig 226 may be supported by columns sitting on hulls and/or pontoons that are ballasted below the water surface, which may be referred to as a semi-submersible platform or rig. In an off-shore location, a casing may extend from the servicing rig 226 to exclude sea water and contain drilling fluid returns. It is understood that other mechanical mechanisms, not shown, may control the run-in and withdrawal of the workstring 228 in the wellbore 222, for example a draw works coupled to a hoisting apparatus, a slickline unit or a wireline unit including a winching apparatus, another servicing vehicle, a coiled tubing unit, and/or other apparatus.

In an embodiment, the workstring 228 may comprise a conveyance 230 and a toolstring 232. The toolstring 232 may comprise one or more downhole tools. In an embodiment, the toolstring 232 may comprise a crossover assembly 234, an upper packer assembly 236, and a lower packer assembly 238. It is understood that the toolstring 232 may include additional assemblies or subassemblies not identified here, for example a sand screen or other tool. Additionally, the toolstring 232 need not contain the example assemblies 234, 236, 238 and may be made up of other assemblies selected for a given service. The conveyance 230 may be any of a string of jointed pipes, a slickline, a coiled tubing, a wireline, and other conveyances (or combinations thereof) for the toolstring 232.

Turning now to FIG. 6, a wellbore servicing system 250 is described, which may be used in combination with the system 100 described herein to perform a wellbore servicing operation. The wellbore servicing system 250 is a system for fracturing wells in a hydrocarbon reservoir. In fracturing operations, wellbore servicing fluids, such as particle laden fluids, may be pumped at high-pressure into the wellbore 222 or into a portion of the wellbore 222 isolated by one or more packer assemblies. The particle laden fluids may then be introduced into a portion of a subterranean formation 224 at a sufficient pressure and velocity to cut a casing and/or create perforation tunnels and fractures within the subterranean formation 224. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 250 may comprise a blender 262 that is coupled to a wellbore services manifold trailer 268 via flowline 264. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 268 is coupled to eight high pressure (HP) pumps 270 via outlet flowlines 274 and inlet flowlines 272. In alternative embodiments, however, there may be more or fewer HP pumps 270 used in a wellbore servicing operation. Outlet flowlines 274 are outlet lines from the wellbore services manifold trailer 268 that supply fluid to the HP pumps 270. Inlet flowlines 272 are inlet lines from the HP pumps 270 that supply fluid to the wellbore services manifold trailer 268.

The blender 262 mixes solid and fluid components to achieve a well-blended wellbore servicing fluid. As depicted, sand or proppant 252, water 256, and additives 258 may be fed into the blender 264 via feedlines 254, 258, and 260, respectively. The water 256 may be portable, non-portable, untreated, partially treated, or treated water. In an embodiment, the water 256 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In an embodiment, the water 256 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 256 may further comprise local surface water contained in natural and/or manmade water features (such as ditches, ponds, rivers, lakes, oceans, etc.). Further, the water 256 may comprise water obtained from water wells. Still further, the water 256 may comprise water stored in local or remote containers. The water 256 may be water that originated from near the wellbore and/or may be water that has been transported to an area near the wellbore from any distance. In some embodiments, the water 256 may comprise any combination of produced water, flowback water, local surface water, and/or container stored water.

In an embodiment, the blender 262 may be an Advanced Dry Polymer (ADP) blender and the additives 258 may be dry blended and dry fed into the blender 262. In alternative embodiments, however, additives may be pre-blended with water using a GEL PRO blender, which is a commercially available preblender trailer from Halliburton Energy Services, Inc., to form a liquid gel concentrate that may be fed into the blender 262. The mixing conditions of the blender 262, including time period, agitation method, pressure, and temperature of the blender 262, may be chosen by one of ordinary skill in the art with the aid of this disclosure to produce a homogeneous blend having a desirable composition, density, and viscosity. Some or all of these mixing conditions of the blender 262 may be input using the ACE control station 164 at the central control site 104 and communicated as command inputs to the controller 130 coupled to the blender 262. In alternative embodiments, however, sand or proppant, water, and additives may be premixed and/or stored in a storage tank before entering the wellbore services manifold trailer 268.

The HP pumps 270 pressurize the wellbore servicing fluid to a pressure suitable for delivery into the wellhead 278. The wellhead 278 may be a Christmas tree apparatus coupled to casing cemented into the wellbore 222. For example, the HP pumps 270 may increase the pressure of the wellbore servicing fluid to a pressure of up to about 20,000 psi or higher. The HP pumps 270 may comprise any suitable type of high pressure pump, such as positive displacement pumps.

From the HP pumps 270, the wellbore servicing fluid may reenter the wellbore services manifold trailer 268 via inlet flowlines 272 and be combined so that the wellbore servicing fluid may have a total fluid flow rate that exits from the wellbore services manifold trailer 268 through flowline 276 to the wellhead 278 of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

It is understood that one or more components of the wellbore servicing system 250 may be coupled to the system 100 described above with reference to FIG. 1. For example, the controllers 130 may control the HP pumps 270, the dispensing of sand/proppant 252, the dispensing of water 256 and/or the replenishment of water 256, the dispensing of additives 258. Sensors associated with the wellbore services manifold trailer 268, the HP pumps 270, the flowlines 254, 258, 260, 264, 272, 274, 276, the blender 262, and other devices may be coupled to the first JLAN 132, and this data may be communicated back to the second JLAN 162 and further monitored and/or controlled as described above.

Figure 7:
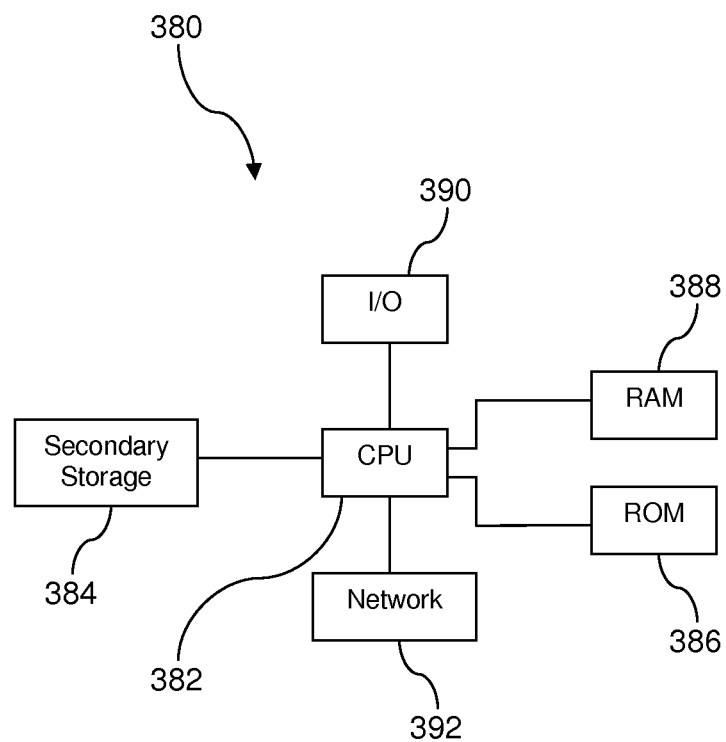
FIG. 7 is an illustration of a computer system according to aspects of an embodiment of the disclosure.

FIG. 7 illustrates a computer system 380 suitable for implementing one or more aspects of the embodiments disclosed herein. For example, some of the controllers 130, the internet protocol gateways 112, 118, 120, 152, the ACE transporters 134, 160, the ACE control stations 140, 164, the IFS workstations 142, 166, and other devices may be implemented as computer systems of the type described with reference to FIG. 7. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation.

Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of servicing a wellbore, comprising:
transporting a plurality of first wellbore servicing equipment to a first wellsite;
establishing an equipment communication link between at least some of the first wellbore servicing equipment and a first job local area network;
converting communications from the first job local area network directed to a remotely located central control site from job local area network packets to internet protocol packets;
converting communications from the central control site directed to the first job local area network from internet protocol packets to job local area network packets;
establishing radio communication link between an on-site portable radio at the first wellsite and an on-site radio station at the first wellsite;
converting a baseband signal based on a radio transmission received by the on-site radio station at the first wellsite from the on-site portable radio at the first wellsite to an internet protocol packet audio stream;
converting a video stream generated by an on-site video camera at the first wellsite to an internet protocol video stream;
establishing a communication link between the first wellsite and the central control site, wherein the communication link carries the internet protocol video stream based on the video stream generated by the on-site video camera at the first wellsite to the central control site, carries the internet protocol audio stream based on the radio transmission received by the on-site radio station at the first wellsite to the central control site, carries data generated by the first wellbore servicing equipment to the central control site, carries control parameters from the central control site to the first wellsite, carries internet protocol audio from the central control site to the first wellsite;
displaying the video stream from the first wellsite on a display at the central control site;
analyzing at the central control site the data generated by the first wellbore servicing equipment;
storing the data generated by the first wellbore servicing equipment in a data store at the central control site;
storing the data generated by the first wellbore servicing equipment in a second data store at the first wellsite;
determining at the first wellsite that the communication link between the first wellsite and the central control site has been restored to service after a service interruption;

in response to determining the restoration of service of the communication link between the first wellsite and the central control site, resynchronizing the data store at the central control site with the second data store at the first wellsite, wherein resynchronizing comprises transmitting data that was stored the second data store during the service interruption of the communication link to the data store at the central control site;

displaying the results of the analysis of the data generated by the first wellbore servicing equipment on a display at the central control site;

entering job control parameters for the first wellbore servicing equipment at the central control site; and transmitting the job control parameters for the first wellbore servicing equipment entered at the central control site to the first wellsite, wherein the first wellbore servicing equipment is commanded to service a first wellbore.

2. The method of claim 1, wherein the analyzing is performed by a wellbore fracturing analysis software program executing on an at least one computer at the central control site.

3. The method of claim 1, wherein the first wellbore servicing equipment comprises at least one of a cement controller, a sand controller, a pump controller, a blender controller, a tote controller, an additive controller, or an instrumentation controller.

4. The method of claim 1, wherein the equipment communication links between the first wellbore servicing equipment and the first job local area network is provided in part by a wireless communication link.

5. The method of claim 1, wherein the communication link between the first wellsite and the central control site is provided at least in part by a satellite communication link.

6. The method of claim 1, further comprising testing the communication link between the first wellsite and the central control site.

7. The method of claim 6, wherein the testing comprises validating that data generated by the first wellbore servicing equipment is received at the central control site and that control parameters from the central control site are received at the first wellbore servicing equipment.

8. The method of claim 7, wherein the job control parameters for the first wellbore servicing equipment are based at least in part on the data generated by the first wellbore servicing equipment and on the data generated by the second wellbore servicing equipment.

9. The method of claim 1, further comprising:
transporting a plurality of second wellbore servicing equipment to a second wellsite;
establishing an equipment communication link between at least some of the second wellbore servicing equipment and a second job local area network;
converting communications from the second job local area network directed to the remotely located central control site from job local area network packets to internet protocol packets;
converting communications from the central control site directed to the second job local area network from internet protocol packets to job local area network packets;
establishing a radio communication link between a plurality a portable radio at the second wellsite and an on-site radio station at the second wellsite;
converting a baseband signal based on a radio transmission received by the on-site radio station at the second wellsite from the on-site portable radio at the second wellsite to an internet protocol packet audio stream;
converting a video stream generated by anon-site video camera at the second wellsite to an internet protocol video stream;
establishing a communication link between the second wellsite and the central control site, wherein the communication link carries the internet protocol video stream generated by the on-site video camera at the second wellsite to the central control site, carries the internet protocol audio stream based on the radio transmission received by the on-site radio station at the second wellsite to the central control site, carries data generated by the second wellbore servicing equipment to the central control site, carries control parameters from the central control site to the second wellsite, carries internet protocol audio from the central control site to the second wellsite;
displaying the video stream from the second wellsite on a display at the central control site;
analyzing at the central control site the data generated by the second wellbore servicing equipment;
storing the data generated by the second wellbore servicing equipment in a data store at the central control site;
displaying the results of the analysis of the data generated by the second wellbore servicing equipment on a display at the central control site;
entering job control parameters for the second wellbore servicing equipment at the central control site; and
transmitting the job control parameters for the second wellbore servicing equipment entered at the central control site to the second wellsite, wherein the second wellbore servicing equipment is commanded to service a second wellbore.

10. The method of claim 9, wherein the job control parameters for the second wellbore servicing equipment are based at least in part on the data generated by the first wellbore servicing equipment and on the data generated by the second wellbore servicing equipment.

11. A method of servicing a wellbore, comprising;
initiating a plurality of wellbore servicing equipment at a wellbore site;
initiating a central control site;
establishing a communication link between the wellbore site and the central control site, the communication link carrying internet protocol video packets, internet protocol audio packets based on radio communication among wellbore site personnel, and sensor data generated by the wellbore servicing equipment from the wellbore site to the central control site and carrying control parameters from the central control site to the wellbore site, whereby the control parameters at least in part command the operation of the wellbore servicing equipment;
inputting operational parameters to a first stimulation modeling system executing at the central control site, wherein the first stimulation modeling system receives sensor inputs from the wellbore site, stores the sensor inputs and the operational parameters to a first data store, models fluid behavior, predicts fluid behavior, and presents modeled and predicted fluid behavior;
transmitting operational parameters and information about the modeled fluid behavior and predicted fluid behavior to a second stimulation modeling system executing at the wellbore site to establish a stimulation modeling and prediction alliance;
performing a wellbore servicing job using the wellbore servicing equipment, wherein the wellbore servicing equipment is controlled at least in part from the central control site based on the control parameters transmitted to the wellbore site from the central control site over the communication link;

the second stimulation modeling system storing sensor inputs from the wellbore site to a second data store;

the second stimulation modeling system determining that the communication link between the wellbore site and the central control site has been restored to service after a service interruption; and the second stimulation modeling system reestablishing the stimulation modeling and prediction alliance in response to determining that the communication link has been restored, wherein reestablishing the alliance comprises transmitting sensor inputs from the wellbore site that were stored in the second data store during the communication link service interruption from the second data store to the first data store.

12. The method of claim 11, wherein the wellbore servicing equipment comprises at least one of a cement controller, a sand controller, a pump controller, a blender controller, a tote controller, an additive controller, or an instrumentation controller.

13. The method of claim 11, further comprising testing the communication link between the wellbore site and the central control site.

14. The method of claim 11, wherein the operational parameters comprise one or more wellbore configuration parameters or one or more wellbore treatment parameters.

15. The method of claim 14, wherein the wellbore configuration parameters comprise at least one of a surface line length, a surface line size, a liner length, a liner size, a casing length, a casing size, a tubing length, a tubing size, an open hole length, or an open hole size; and the wellbore treatment parameters comprise one or more of a volume of fluid, an amount of fluid, a type of fluid, a fluid density, a fluid viscosity, a fluid rheological property, a volume of additive, an amount of additive, a type of additive, a volume of proppant, an amount of proppant, a type of proppant, a treatment pressure, or a treatment time interval.

16. The method of claim 11, wherein the first stimulation modeling system models fluid behavior in real-time, predicts fluid behavior in real-time, and predicts bottom hole conditions in real-time, and wherein the wellbore servicing equipment is controlled from the central control site based at least in part on the modeled and predicted fluid behavior and on the predicted bottom hole conditions.

17. The method of claim 11, further comp sing;
initiating a plurality of wellbore servicing equipment at a second wellbore site;

establishing a second communication link between the second wellbore site and the central control site, the communication link carrying at least sensor data generated by the wellbore servicing equipment at the second wellbore site to the central control site and control parameters from the central control site to the wellbore servicing equipment at the second wellbore site, whereby the control parameters sent to the second wellbore site at least in part command the operation of the wellbore servicing equipment at the second wellbore site.

18. The method of claim 11, wherein the wellbore servicing job is at least one of a hydraulic fracturing job, an acidation job, and an expandable gel injection job.

19. The method of claim 11, wherein the wellbore servicing equipment is controlled at least in part from the central control site based on the sensor inputs from the wellbore site that were stored in the second data store during the communication link service interruption and that are transmitted to the central control site during reestablishing the stimulation modeling and prediction alliance.

20. A system for servicing a wellbore, comprising:
a first gateway for con converting communications from a first job local area network directed to a remotely located central control site from job local area network packets to internet protocol packets and for converting communications from the central control site directed to the first job local area network from internet protocol packets to job local area network packets;

a second gateway;

a radio transceiver to establish radio communication links between an on-site portable radio at the first wellsite and the second gateway, wherein the second gateway converts communications from the on-site portable radio to internet protocol packets for transmitting to the central control site and converts interact protocol packets from the central control site to communications directed to the on-site portable radio;

an on-site video camera;

a third gateway to convert a video stream generated by the on-site video camera to an internet protocol video stream;

a first communication modern for establishing a communication link between the wellsite and the central control site, wherein the communication link carries the internet protocol video stream based on the video stream generated by the on-site video camera to the central control site, carries the internet protocol audio stream based on the radio transmission received by the second gateway to the central control site, carries data generated by the wellbore servicing equipment to the central control site, carries control parameters from the central control site to the wellsite, carries internet protocol audio from the central control site to the wellsite;

a first monitor at the central control site that displays the video stream from the first wellsite;

a computer at the central control site executing a wellbore fracturing analysis program that analyzes the data generated by the first wellbore servicing equipment;

a data store at the central control site that stores the data generated by the first wellbore servicing equipment;

second data store at the first wellsite that stores the data generated by the first wellbore servicing equipment;

a server at the first wellsite that detects the communication link between the wellsite and the central control site has been restored to service after a service interruption and transmits data generated by the first wellbore servicing equipment that was stored in the second data store during the service interruption to the data store at the central control site after detecting that the communication link has been restored to service after the service interruption;

a second monitor at the central control site that displays the results of the analysis of the data generated by the first wellbore servicing equipment; and a workstation at the central control site for entering job control parameters for the first wellbore servicing equipment, the job control parameters to be transmitted over the communication link from the central control site to the wellsite.

* * * * *

UNITED STATES PATENT AND TRADEMARK OFFICE
CERTIFICATE OF CORRECTION

PATENT NO. : 8,616,274 B2
APPLICATION NO. : 12/775800
DATED : December 31, 2013
INVENTOR(S) : Donald A. Belcher et al.

It is certified that error appears in the above-identified patent and that said Letters Patent is hereby corrected as shown below:

In the Claims

In Column 23, line 6, replace "stored the" with --stored in the--.

In Column 24, line 1, replace "anon-site" with --an on-site--.

In Column 25, line 47, replace "comp sing" with --comprising--.

In Column 26, line 7, replace "for con converting" with --for converting--.

In Column 26, line 46, replace "second data" with --a second data--.

In Column 26, line 48, replace "detects the" with --detects that the--.

Signed and Sealed this
Eleventh Day of March, 2014

Michelle K. Lee
*Deputy Director of the United States Patent and Trademark Office*